(12) United States Patent
Pizzarulli

(10) Patent No.: US 7,625,133 B2
(45) Date of Patent: Dec. 1, 2009

(54) METHOD OF ASSEMBLING OPTOELECTRONIC DEVICES AND AN OPTOELECTRONIC DEVICE ASSEMBLED ACCORDING TO THIS METHOD

(76) Inventor: Andrea Pizzarulli, 734 Live Oak Ave., Menlo Park, CA (US) 94025

( * ) Notice: Subject to any disclaimer, the term of this patent is extended or adjusted under 35 U.S.C. 154(b) by 0 days.

(21) Appl. No.: 11/875,750

(22) Filed: Oct. 19, 2007

(65) Prior Publication Data

US 2008/0085083 A1    Apr. 10, 2008

Related U.S. Application Data

(63) Continuation of application No. 11/165,548, filed on Jun. 24, 2005, now Pat. No. 7,329,052.

(30) Foreign Application Priority Data

Jun. 25, 2004    (EP) .................................. 04014998

(51) Int. Cl.
*G02B 6/36* (2006.01)
(52) U.S. Cl. .............................. 385/88; 385/89; 385/92; 385/94
(58) Field of Classification Search ................... 385/88
See application file for complete search history.

(56) References Cited

U.S. PATENT DOCUMENTS

| | | | |
|---|---|---|---|
| 5,647,042 A | 7/1997 | Ochiai et al. ................... 385/56 |
| 5,793,914 A * | 8/1998 | Sasaki ........................... 385/49 |
| 5,905,831 A | 5/1999 | Boudreau et al. .............. 385/88 |
| 5,960,141 A | 9/1999 | Sasaki et al. ................... 385/88 |
| 6,241,399 B1 | 6/2001 | Nobuhara ...................... 385/89 |
| 6,257,772 B1 | 7/2001 | Nakanishi et al. ............. 385/89 |
| 6,263,137 B1 * | 7/2001 | Yoneyama et al. ............. 385/49 |
| 6,599,029 B2 | 7/2003 | Yamazaki et al. .............. 385/80 |
| 6,641,308 B2 | 11/2003 | Nobuhara et al. .............. 385/84 |
| 6,668,125 B2 | 12/2003 | Go ................................. 385/134 |
| 6,850,674 B2 | 2/2005 | Haraguchi et al. ............. 385/49 |

FOREIGN PATENT DOCUMENTS

EP    0943943    9/1999

OTHER PUBLICATIONS

European Search Report for EP Application No. 04014998.

* cited by examiner

*Primary Examiner*—Ryan Lepisto
(74) *Attorney, Agent, or Firm*—Perkins Coie LLP

(57) ABSTRACT

A method of assembling an optical device comprising an optical ferrule (1) is provided, according to which said one optical ferrule (1) is secured to a first substrate (3) so as to form an optical subassembly (13); the method further comprises providing a second substrate (9) comprising a main surface (9a) and at least one groove (9b) extending from said main surface to a predefined depth and securing said optical subassembly (13) to said second substrate (9) in such a way that said at least one optical ferrule (1) is at least partially received into said at least one groove (9b). There is further provided an optical device assembled according to this method.

9 Claims, 8 Drawing Sheets

METHOD OF ASSEMBLING OPTOELECTRONIC DEVICES AND AN OPTOELECTRONIC DEVICE ASSEMBLED ACCORDING TO THIS METHOD

CROSS-REFERENCE TO RELATED APPLICATIONS

This patent application is a continuation of U.S. patent application Ser. No. 11/165,548, filed Jun. 24, 2005, and claims benefit of foreign priority of European Patent Application No. 04014998.1, filed on Jun. 25, 2004, each of which is incorporated herein by reference.

FIELD OF THE PRESENT INVENTION

The present invention relates generally to optoelectronic devices. More particularly, the present invention relates to a method of assembling and/or packaging optoelectronic devices. In more detail, the present invention relates to a method of assembling and/or packaging optical transceivers comprising an optical ferrule.

DESCRIPTION OF THE PRIOR ART

During the last years, much development work has been devoted to the provision of practical, low cost technologies for assembling and packaging electronic devices. Along the technologies developed and proposed, the chip-on-board (COB) technology became the most largely used technology for assembling electronic devices comprising integrated circuits. According to the COB technology, integrated circuits are mechanically secured to a printed circuit board (PCB) by means of an adhesive such as epoxy, and then electrically connected via wire bonding to pads on the PCB. Once the integrated circuit has been secured to the PCB, the resulting device is covered with a specially designed compound. The resulting device is therefore identical to those assembled into various single-chip package formats. The COB mounting technology has a long history in the hybrid-circuit industry and continues to be the most popular method for mounting die products. In particular, the COB mounting technology is extensively used in very low cost products with few components such as, toys and calculators.

Optoelectronic devices usually comprise both monolithic and hybrid integrated circuits along with optical components. In particular, the optical components are provided on one or more planar lightwave circuits (PLC). These PLCs essentially comprise a bench, for instance a silicon bench or a similar substrate and lightwave guides connecting the optical components provided on the bench. Moreover, one or more optical ferrules are usually used for the purpose of connecting the optoelectronic device to the outside and external appliances; in particular, said one or more optical ferrules are some way secured to the PLC so as to provide an optical connection between the optical components of the PLC and said external appliances.

However, in those applications in which optical transceiver circuits (PLC) of the kind described above are used as components of optoelectronic devices comprising integrated circuits, the problem arises that the PLCs may not be secured to a PCB using the same technology used for securing integrated circuits to the PCB. In particular, the PLC may not be secured to a PCB using standard surface mounting technologies (SMT). This is due to the fact that the optical ferrule representing the interface between the PLC module and the outside packages and/or devices, may not be adequately secured to the PCB. In fact, the optical ferrule usually protrudes from the bench on which the planar light waveguides and the optical components are provided. Moreover, the structure and the external dimensions of the optical ferrule normally do not allow that the PLC modules be secured to a PCB. Accordingly, technologies other than the SMT and/or COB technologies must be used for the purpose of assembling optoelectronics devices comprising both integrated circuits and PLC modules. However, these technologies are quite troublesome and expensive so that the assembling yields are drastically reduced and the assembling costs increase.

Accordingly, in view of the problems explained above, it would be desirable to provide a method and/or a technology that may solve or reduce these problems. In particular, it would be desirable to provide a method for assembling optoelectronic devices allowing standard surface mounting and/or technologies to be used. In more detail, it would be desirable to provide a method of assembling optoelectronic devices, allowing optical modules comprising a protruding interface pigtail such as an optical ferrule to be secured to a PC board so that optical components of such an optical module may be connected to one or more pads on the PC board by means of standard wire bonding technologies.

SUMMARY OF THE PRESENT INVENTION

In general, the present invention is based on the consideration that optical modules such as PLC modules (comprising a protruding interface pigtail such as an optical ferrule) may be adequately secured to a printed circuit board through standard surface mounting technologies, when the PC board is adequately prepared. In other words, the present invention is based on the consideration that optical modules comprising a bench with planar light wave guides along with optical components and an optical ferrule protruding from this bench may be adequately secured to printed circuit boards through standard surface mounting technologies if a receiving groove is provided on the PCB, with the long groove being adapted to at least partially receive the interface pigtail (the optical ferrule) of the PLC module. If the optical ferrule may be at least partially received in a groove or housing formed on the printed circuit board, then the bench of the PLC module may be placed on the circuit board so that the bottom surface of the bench adheres to the top surface of the printer circuit board. Accordingly, standard methods may be used for securing the PLC module to the printed circuit board; for instance, adhesives such as epoxy may be used for this purpose. Moreover, standard wire bonding technologies may be used for electrically connecting the optical component of the PLC module to conductive portions such as pads provided on the printed circuit board. On the basis of the consideration as stated above, a first embodiment of the present invention relates to a method of assembling a device comprising at least one optical ferrule; moreover, said method comprises securing said at least one optical ferrule to a first substrate so as to form an optical sub assembly and providing a second substrate comprising a main surface and at least one groove extending from said main surface to a predefined depth. The method further comprises securing said optical sub assembly to said second substrate in such a way that said at least one optical ferrule is at least partially received into said at least one groove.

According to another embodiment the present invention relates to a method of assembling a device comprising at least one optical ferrule wherein said at least one optical ferrule comprises at least one optical fiber, at least a portion of which extends from said at least one optical ferrule, and wherein said first substrate comprises a main surface and at least one groove extending from said main surface to a predefined depth; said method further comprises securing said at least one optical ferrule to said first substrate in such a way that said portion of said at least one optical fiber extending from said optical ferrule is at least partially received into said at least one groove.

According to a further embodiment, the present invention relates to an optical connecting device comprising a first substrate and at least one optical ferrule secured to said first substrate so as to form an optical subassembly; said optical connecting device further comprises a second substrate comprising a main surface and at least one groove extending from said main surface to a predefined depth; furthermore, said optical subassembly is secured to said second substrate in such a way that said at least one optical ferrule is at least partially received in said at least one groove.

Further additional embodiments of the present invention are defined in the appended claims.

BRIEF DESCRIPTION OF THE DRAWINGS

Further advantages, objects and features, as well as embodiments of the present invention are defined in the appended claims and will become more apparent with the following detailed description when taken with reference to the accompanying drawings, in which identical corresponding parts are identified by the same reference numbers. In the drawings:

FIGS. 6b and 6c represent a method according to an embodiment of the present invention for securing the optical subassembly of FIGS. 5b and 5c to the substrate of FIG. 6a;

DETAILED DESCRIPTION OF THE INVENTION

Figure 1A:
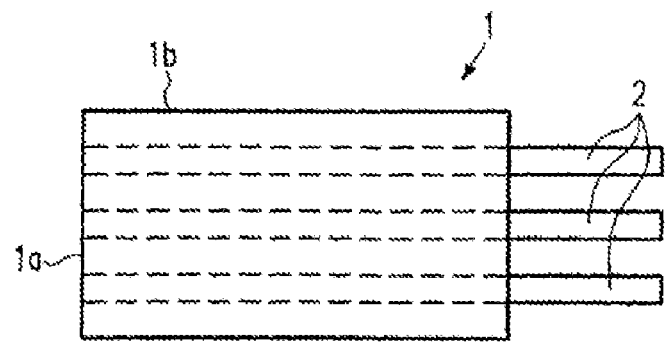
FIGS. 1a and 1b represent a planar view and an exploded view, respectively, of a typical optical ferrule.

While the present invention is described with reference to the embodiments as illustrated in the following detailed description as well as in the drawings, it should be understood that the following detailed description, as well as the drawings are not intended to limit the present invention to the particular illustrative embodiments disclosed, but rather that the described illustrative embodiments merely exemplify various aspects of the present invention, the scope of which is defined by the appended claims.

The present invention is understood to be of particular advantage when used for assembling optoelectronic devices. For this reason, examples will be given in the following in which corresponding embodiments of the present invention relate to the assembly of optoelectronic devices. However, it has to be noted that the present invention is not limited to the assembly of optoelectronic devices but can be used in any other situation in which it is required to secure a module to a substrate, wherein the module comprises a planar bench and a pigtail protruding from this bench. The present invention is therefore also usable in all these applications, and the optoelectronic modules and/or subassemblies described in the following illustrative embodiments are to represent any module, irrespective of the purposes for which these modules are used.

A first embodiment of the method of the present invention will be described in the following with reference to FIGS. 1a-1d through 3a-3d.

Figure 1B:
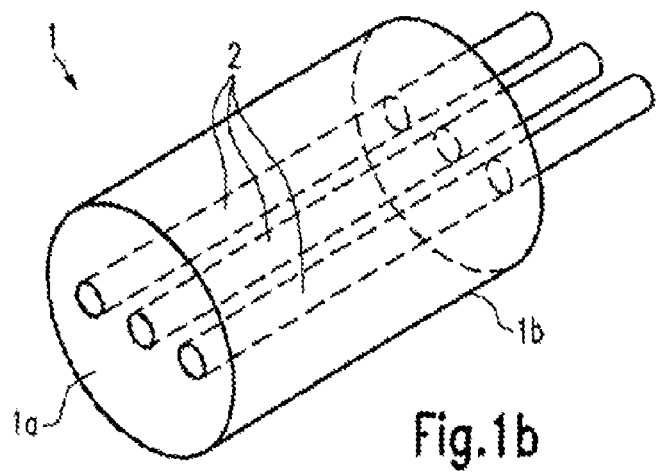

In FIGS. 1a and 1b, reference 1 identifies an optical ferrule of the kind used in optoelectronic devices; in particular, optical ferrules of the kind depicted in FIGS. 1a and 1b are used for transmitting optical signals across optical appliances. To this end, the optical ferrule 1 of FIGS. 1a and 1b comprises a main body 1b and a plurality of optical fibers 2 embedded in the main body. Moreover, the optical fibers 2 comprise end portions projecting and/or extending from said main body 1b. As it will become more apparent through the following disclosure, the end portions of the optical fibers 2 extending outside the main body 1b are adapted to be secured to an optical module; in particular, the end portions of the optical fibers 2 projecting from the main body 1b are adapted to be brought in optical connection with corresponding optical devices of an optical module such as for instance optical devices of a planar light wave circuit. The main body 1b of the optical ferrule 1 comprises an interface surface 1a, adapted to be brought into optical alignment with an optical appliance, such as, for instance, an optical connector. In particular, during use, the interface surface 1a of the optical ferrule 1 is aligned with said optical appliance in such a way that optical signals emitted and/or transmitted by said optical appliance are received by the optical fibers 2 and further transmitted to a second optical appliance, for instance to an optical module such as a planar light wave circuit.

Figure 1C:
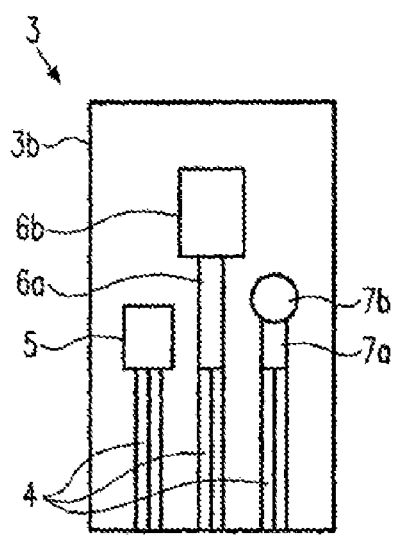
FIGS. 1c and 1d represent a planar view and an exploded view, respectively, of a planar lightwave circuit.
Figure 1D:
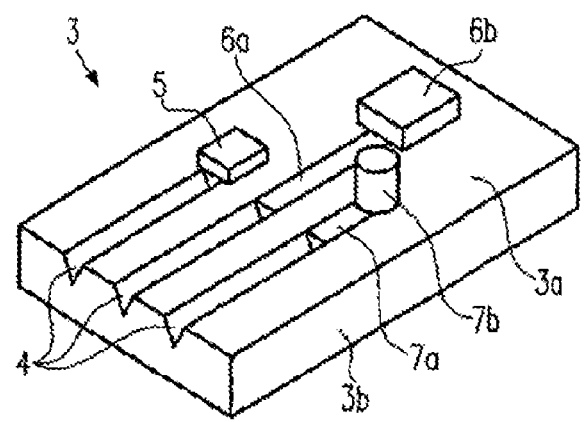

Such a planar light waveguide assembly circuit is depicted in FIGS. 1c and 1d and is identified by reference 3. As apparent from FIGS. 1c and 1d, the optical module or planar light wave circuit 3 comprises a planar bench 3b, for instance a silicon bench or a silicon substrate 3b. On the top surface 3a of the bench 3b, optical devices 5, 6b and 7b are provided. The kind of optical devices provided on the top surface 3a of the substrate 3b depends upon the use intended for the optical module 3 and the final optoelectronic device to be assembled.

For instance, these optical devices may comprise lenses, prisms and the like. Moreover, in addition to the optical devices 5, 6b and 7b, monolithic and/or hybrid electronic devices, for instance integrated circuits may be provided on the top surface 3a of the module 3; these monolithic and/or hybrid electronic devices are not depicted in the figures for reason of clarity. Planar light wave guides 6a and 7a are provided on the substrate 3b of the module 3 for the purpose of transmitting optical signals to the optical devices 6b and 7b; in the particular example depicted in FIGS. 1c and 1d, the optical light wave guides 6a and 6b are at least partially embedded in the substrate 3b. However, other arrangements, well known to those skilled in the art, may be used for the purpose of transmitting optical signals to the optical devices 6b and 7b. It will become apparent from the following disclosure that the optical light wave guides 6a and 7a are adapted to receive optical signals from optical fibers (in particular the optical fibers 2 of the optical ferrule 1 of FIGS. 1a and 1b) and to transmit these signals to the optical devices 6b and 7b. Optical devices, such as the optical device 5 of FIGS. 1c and 1d may also be provided, which are adapted to be directly coupled and/or connected with an optical fiber; this is the reason why, in the example depicted in FIGS. 1c and 1d, no optical light wave guides are provided for the purpose of transmitting optical signals to the optical device 5.

In the embodiment described above and depicted in FIGS. 1a-1d through 3a-3d as well as the embodiments of FIGS. 4a-4d, 5a-5d and 6a-6d, the optical ferrule 1 comprises three optical fibers 2, adapted to be brought in optical connection with corresponding light wave guides 6a and 6b and/or optical devices 5, 6b and 7b. It has however to be noted that other configurations are possible. For instance, a single optical fiber may be brought into optical connection with more than one light wave guide; in this case, the light is forwarded to the one or the other wave guide and/or device depending on its wave length.

As apparent from FIGS. 1c and 1d, the optical device 5 and the optical light wave guides 6a and 7a are aligned with corresponding grooves 4 formed on the main interface 3a of the substrate 3b of the optical circuit 3; these grooves 4 are provided for the purpose of receiving the end portions of the optical fibers 2 protruding from the main body of the optical ferrule 1 of FIGS. 1a and 1b so as to receive optical signals from the optical fibers 2 and transmit these signals to the optical devices 5, 6b and 7b, either directly (in the case of the optical device 5) or through the light wave guides 6a and 7a (in the case of the optical devices 6b and 7b). In the example depicted in FIGS. 1c and 1d the grooves 4 have a V cross sectional shape. However, other cross sectional shapes may be selected for the grooves 4, according to the circumstances. For instance, grooves having a square cross sectional shape or semicircular cross sectional shape or the like may be selected. Also the dimensions of the grooves 4 may be selected according to the circumstances; that is to say that both the width and the depth of the grooves 4 as well as their depth, may be selected depending upon the dimensions of the optical fibers to be received into the grooves 4.

In the following, with reference to FIGS. 2a to 2b, the method step of a first embodiment of the method according to the present invention will be described, according to which the optical ferrule 1 is secured to the optical circuit 3.

Figure 2A:
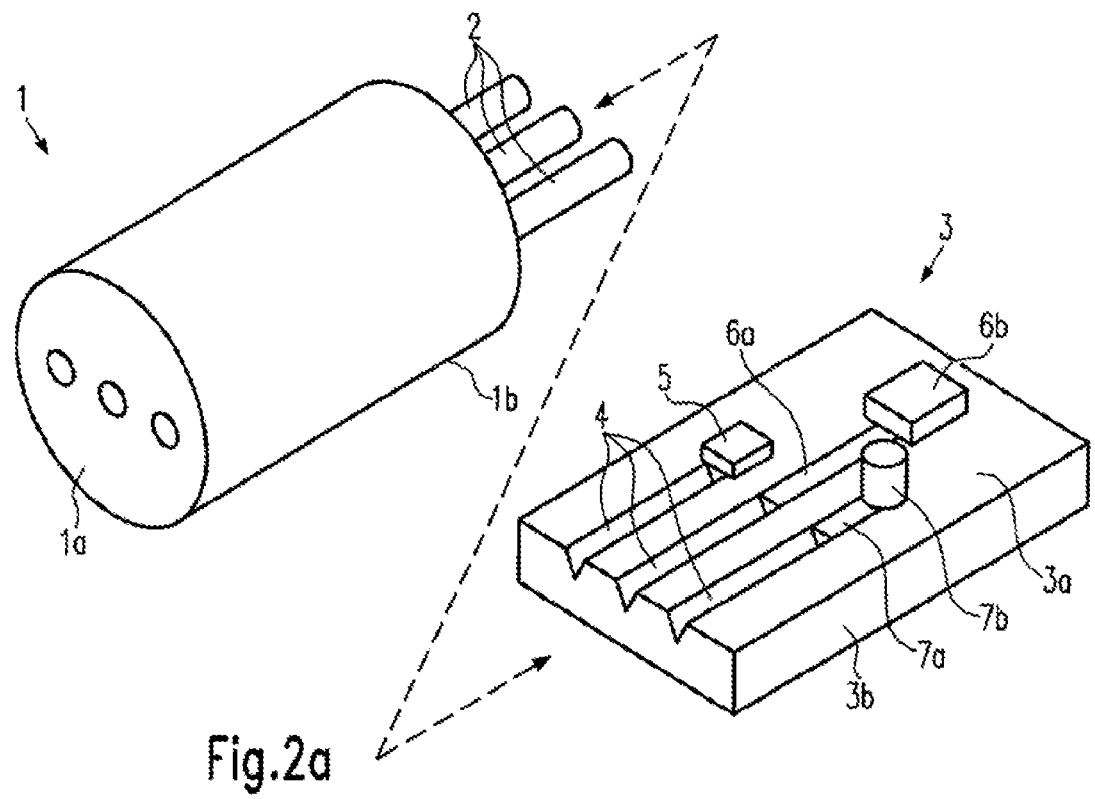
In FIG. 2a there is schematically depicted a method step during which the optical ferrule of FIGS. 1a and 1b is secured to the planar lightwave circuit depicted in FIGS. 1c and 1d.
Figure 2B:
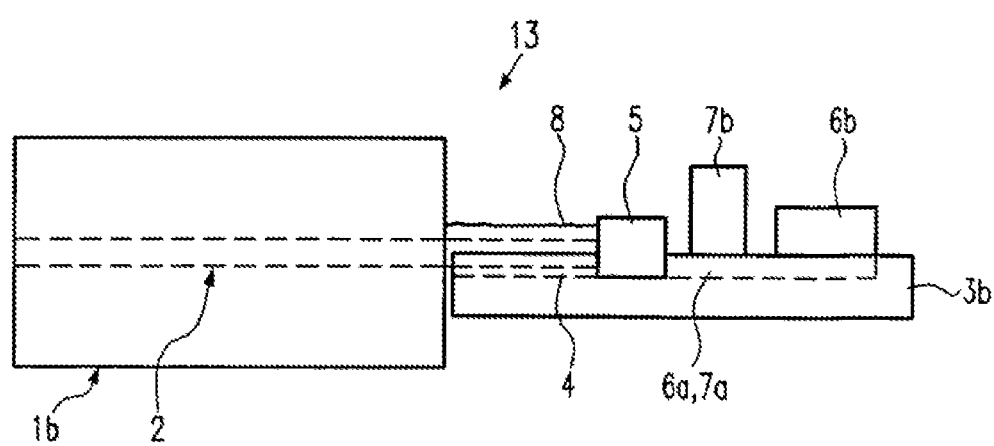
FIGS. 2b and 2c represent a side view and an exploded view, respectively, of an optical subassembly obtained by securing the optical ferrule of FIGS. 1a and 1b to the planar lightwave circuit of FIGS. 1c and 1d.

As apparent from FIG. 2a, the optical ferrule 1 is secured to the optical circuit 3, in such a way that the end portions of the optical fibers 2 protruding from the main body 1b of the optical ferrule 1 are at least partially received into corresponding grooves 4 formed on the main surface 3a of the bench or substrate 3b of the optical circuit 3. In this way, the optical fibers 2 will be automatically aligned with either the optical device 5 or the optical light wave guides 6a and 7a so that optical signals from the optical fibers 2 may be forwarded and/or transmitted to the optical devices 5, 6b and 7b either directly or through the optical guides 6a and 7a. For the purpose of reliably securing the optical ferrule 1 to the optical circuit 3 an adhesive 8 may be used as depicted in FIG. 2b; for instance epoxy may be used to this end. Alternatively, any other material and/or adhesive along those known in the art may be used for the purpose of securing the optical ferrule 1 to the optical circuit 3. In the example depicted in FIG. 2b, the adhesive material 8 is used to secure the optical fibers 2 into the grooves 4; however, additional adhesive (not depicted in the figures) may be used and/or provided for the purpose of reliably connecting the optical ferrule 1 to the optical circuit 3. For instance, it could be desirable and/or useful to provide additional adhesive between the bottom surface of the substrate 3b and the main body 1b of the optical ferrule 1. In the same way, additional adhesive material may be provided so as to embed the all end portion of the optical ferrule 1 from which the optical fibers protrude and the end portion of the substrate 3 facing the optical ferrule 1. Of course, other solutions may be used for the purpose of securing the optical ferrule 1 to the optical circuit 3; for instance, both the optical ferrule 1 and the substrate 3b may be provided with metallic portions such as metallic pads which may then be welded and/or soldered together. These solutions are however well known to those skilled in the art and will not be described in more detail, accordingly.

In FIG. 2c there is depicted the optical subassembly 13 obtained by securing the optical ferrule 1 to the optical circuit 3 as described above; it appears clearly from FIG. 2c that the optical fibers 2 have been aligned to the optical guides 6a and 7a as well as to the optical device 5. Moreover, it appears clearly from FIG. 2c that an adhesive and/or sealing material 8 such as epoxy has been used for securing the optical fibers 2 into the groove 4 formed on the surface 3a of the optical circuit 3. The optical subassembly 13 depicted in FIG. 2c and comprising the optical ferrule 1 and the optical circuit 3 secured to each other may be used as a pick-and-place assembly, namely as an assembly which can be easily placed on a substrate such as a printed circuit board and removed from said substrate.

Figure 2C:
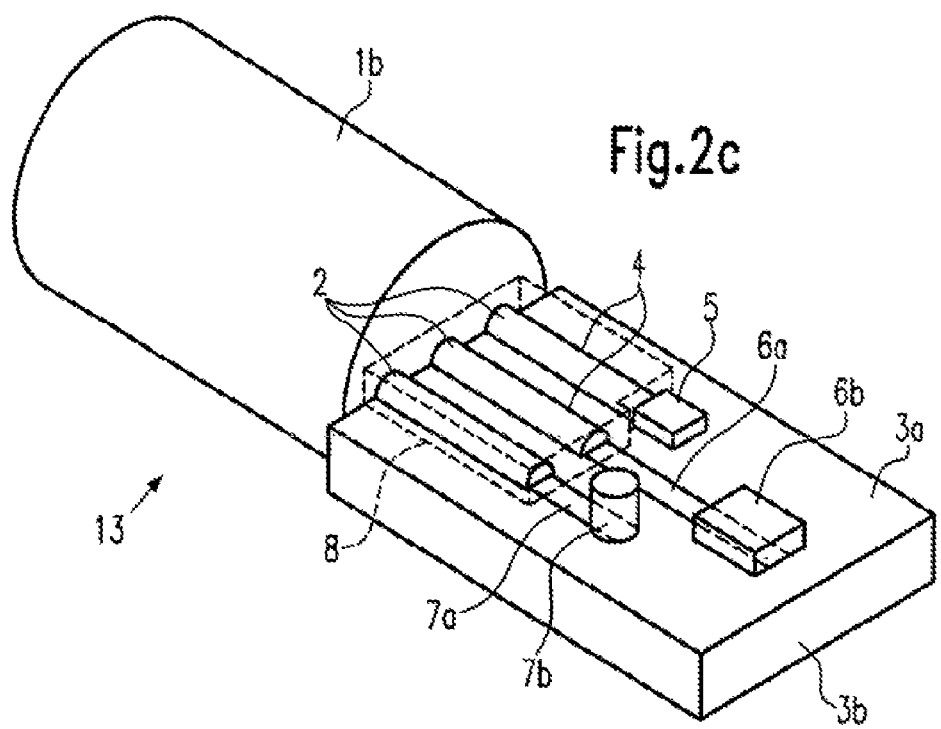
Figure 3A:
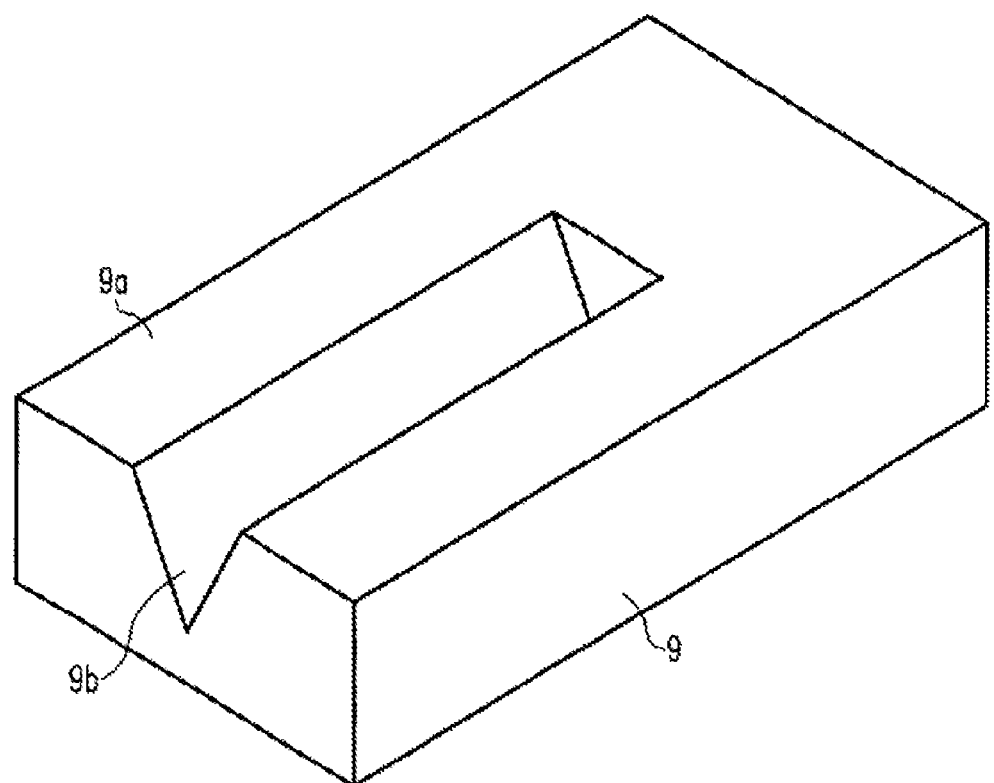
in FIG. 3a there is schematically depicted a substrate on which the optical subassembly of FIGS. 2b and 2c may be secured.

In FIG. 3a there is depicted a substrate 9, to which the subassembly 13 depicted in FIG. 2c may be secured according to an embodiment of the method of the present invention. As apparent from FIG. 3a, the substrate 9 comprises a top surface 9a and a groove 9b provided on said main surface 9a to a predefined depth. It will become clear from the following disclosure that the groove 9b is adapted to receive at least a portion of the ferrule 1 of the subassembly 13 of FIG. 2c when said subassembly 13 is secured to the substrate 9, in particular, when the bench or substrate 3b of the optical circuit 3 is placed on the main surface 9a of the substrate 9. The substrate 9 may be a usual printed circuit board, i.e. a substrate comprising on its top surface 9a, conductive pads and/or strips (not depicted in FIG. 3a) as well as monolithic and/or hybrid electronic devices (also not depicted in FIG. 3a). The kind of devices eventually provided on the surface 9a of the substrate 9 is not essential to the present invention. Accordingly, theses devices will not be described in more detail.

Figure 3B:
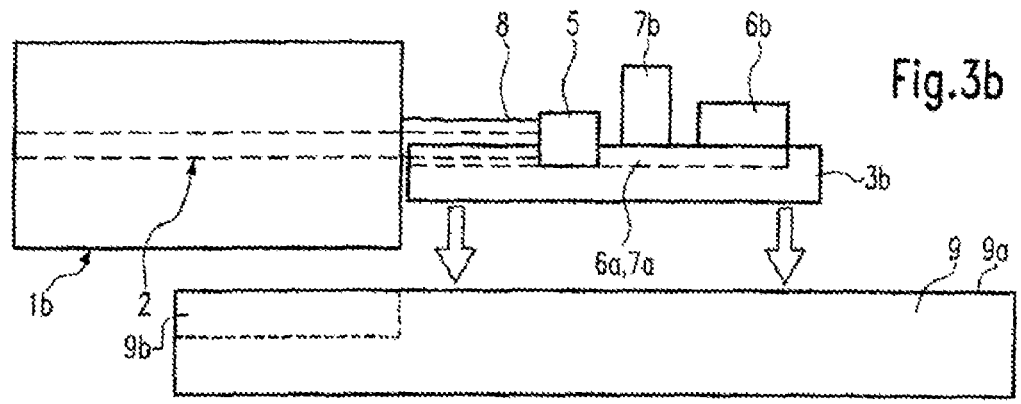
FIGS. 3b and 3c represent a method according to which the optical subassembly of FIGS. 2b and 2c is secured to a substrate.

In FIG. 3b two method steps of an embodiment of the method of the present invention are depicted, according to which the optical subassembly 13 of FIG. 2c is secured to the substrate 9.

Figure 3C:
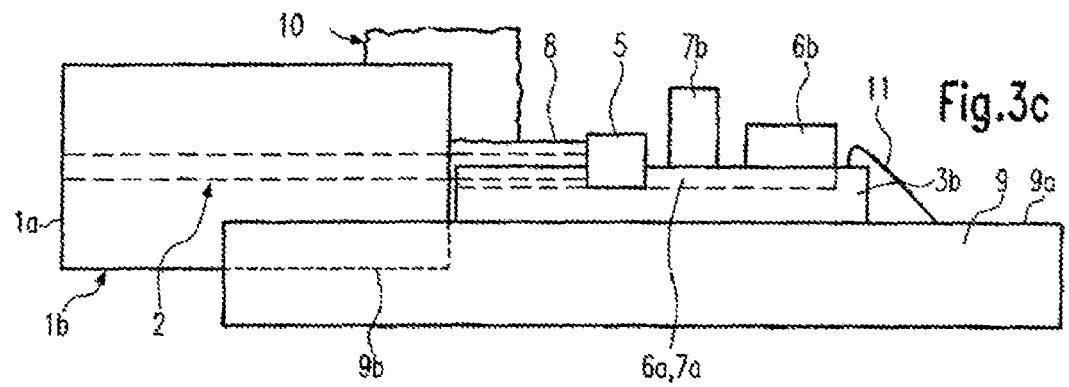

During a first step as depicted in FIG. 3b, the subassembly 13 comprising the optical ferrule 1 and the optical circuit 3 is aligned with the substrate 9; in particular, the subassembly 13 is aligned with the substrate 9 in such a way that the optical ferrule 1 is brought into correspondence of the groove 9b formed in the substrate 9. Subsequently, as depicted in FIG. 3c, the optical subassembly 13 is placed on the substrate 9 in such as way that the bench 3b of the optical circuit 3 is placed on the surface 9a of the substrate 9 and the optical ferrule 1 is at least partially received into the groove 9b of the substrate 9, As depicted in FIG. 3c, the reciprocal position of the optical subassembly 13 and the substrate 9 is such that the end portion of the optical ferrule 1 opposed to the end portion of the optical ferrule 1 from which the optical fibers 2 protrude, also protrudes from the substrate 9. In other words, the groove 9b has a length which is less than the total length of the optical ferrule 1. This will allow the final optoelectronic device comprising the optical ferrule 1, the optical circuit 3 and the substrate 9 to be easily connected with an optical connector of an external appliance. In particular, this will allow the optical fiber 2 on the interface 1a of the optical ferrule 1 to be optically aligned and coupled with corresponding optical signal transmitting appliances. Moreover, as depicted in FIG. 3c, the optical subassembly 13 is secured to the substrate 9 in such a way that a portion of the optical ferrule 1 protrudes from the main surface 9a of the substrate 9; how much the optical ferrule 1 will protrude from the surface 9a of the substrate 9 will depend upon the dimensions (width and depth) of the groove 9b as well as upon the external dimensions of the optical ferrule 1. Whether a small portion or a big portion of the optical ferrule 1 protrudes from the surface 9a of the substrate 9 is not essential to the present invention; however, it has revealed to be of advantage, that the dimensions of the groove 9b are selected so as to allow, on the one hand, at least a portion of the optical ferrule 1 to be received into the groove 9b and, on the other hand, to allow the bench or substrate 3b of the optical circuit 3 to be brought into contact with the surface 9a of the substrate 9. This in particular improves the overall stability of the final optoelectronic device depicted in FIG. 3c. In the same way as in the case of the grooves 4 formed on the substrate 3b of the optical circuit 3 (see FIGS. 2c and 2d) the shape of the groove 9b may be selected according to the circumstances. In the example depicted in FIGS. 3a through 3c, the groove 9b has a V cross sectional shape; however, other shapes may be selected, for instance a square cross sectional shape and/or a semicircular cross sectional shape. Once the optical subassembly 13 comprising the optical ferrule 1 and the optical circuit 3 has been placed on the substrate 9 as depicted in FIG. 3c, the optical subassembly is secured to the substrate. For instance, to this end, an adhesive such as epoxy may be used; moreover the portions to be reciprocally secured by means of said adhesive may be also selected according to the circumstances. For instance, adhesive may be put into the groove 9b so as to directly connect the optical ferrule 1 to the substrate 9. Alternatively and/or additionally, adhesive may be used for securing the bench or substrate 3b of the optical circuit 3 to the main surface of the substrate 9. As depicted in FIG. 3c, adhesive material 10 may also be used for securing to the substrate 9 the portion of the subassembly 13 where the optical ferrule 1 faces the optical circuit 3 (see also FIG. 3d). The optical subassembly 13 and the substrate 9 may also be welded and/or soldered onto each other; for instance, to this end, metal portions may be provided on both the optical subassembly 13 (either on the optical ferrule 1 or the bench 3b) and on the substrate 9 which can be then welded or soldered together. Once the optical subassembly 13 comprising the optical ferrule 1 and the optical circuit 3 has been secured to the substrate 9 as depicted in FIG. 3c, a wire bonding step may be carried out for the purpose of electrically connecting the optical circuit 3 and the substrate 9. For instance, as depicted in FIG. 3c, wires 11 may be soldered and/or welded to metal pads (not depicted in the figures) provided on both the bench 3b of the optical circuit 3 and on the substrate 9.

Figure 3D:
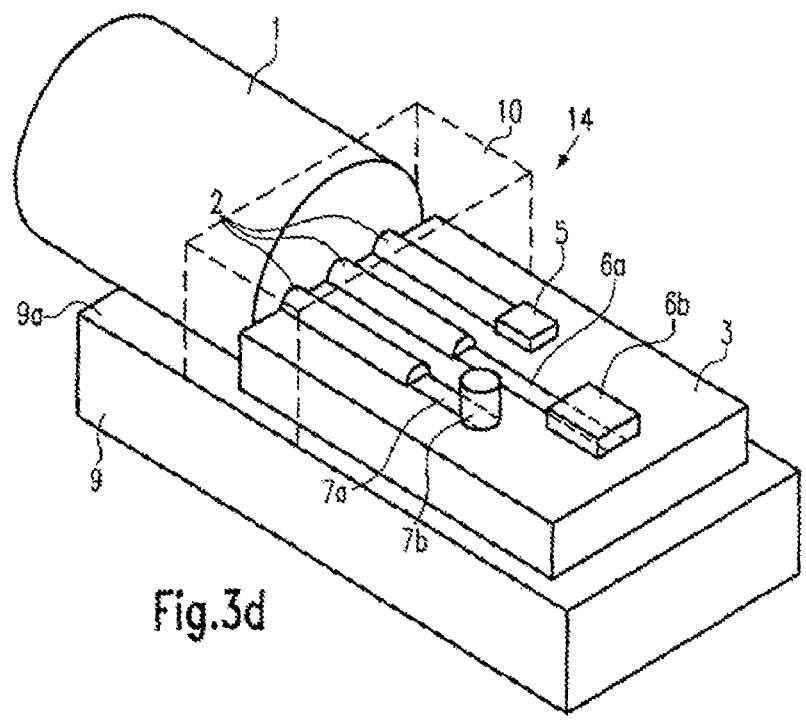
FIG. 3d represents an exploded view of an optoelectronic device assembled according to one embodiment of the method of the present invention.

In FIG. 3d there is schematically depicted an optoelectronic device 14 assembled according to the method as disclosed above. As apparent from FIG. 3d, said optoelectronic device 14 has the advantage that the optical ferrule 1 and the optical circuit 3 may be easily placed on and/or secured to the substrate 9 and removed from the substrate 9. A further advantage of the optoelectronic device 14 depicted in FIG. 3d relates to the fact that at least the end portion of the optical ferrule 1 opposed to the end portion from which the optical fibers 2 protrude from said optical ferrule 1, also protrudes from the substrate 9. As stated above, this allows in particular the optoelectronic device 14 depicted in FIG. 3 to be easily optically connected with external appliances.

In the following, with reference to FIGS. 4a-4d through 6a-6d, another embodiment of the method of the present invention will be described, according to which optoelectronic devices may be conveniently assembled.

Figure 4A:
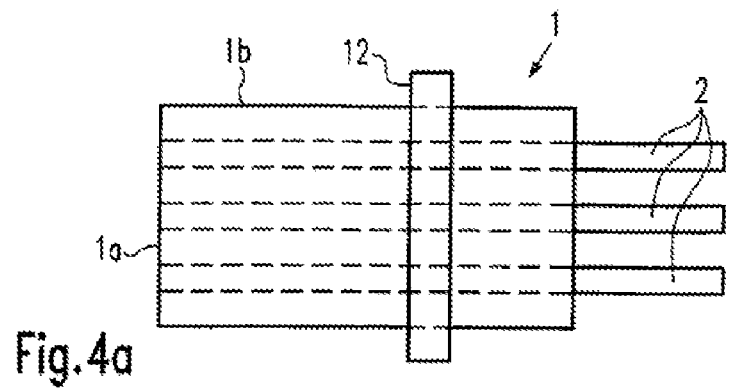
FIGS. 4a and 4b represent a planar view and an exploded view, respectively, of another optical ferrule.
Figure 4B:
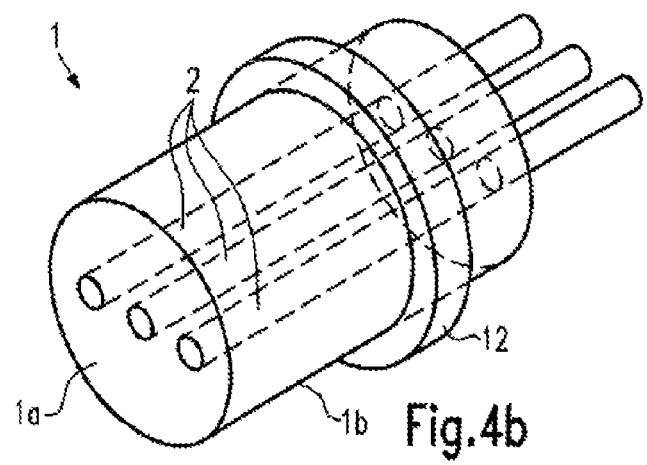
Figure 4C:
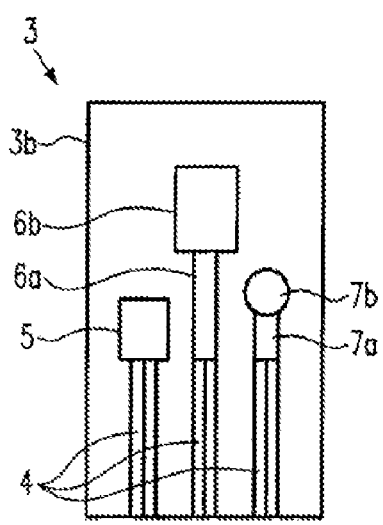
FIGS. 4c and 4d represent a planar view and an exploded view, respectively, of a planar lightwave circuit.
Figure 4D:
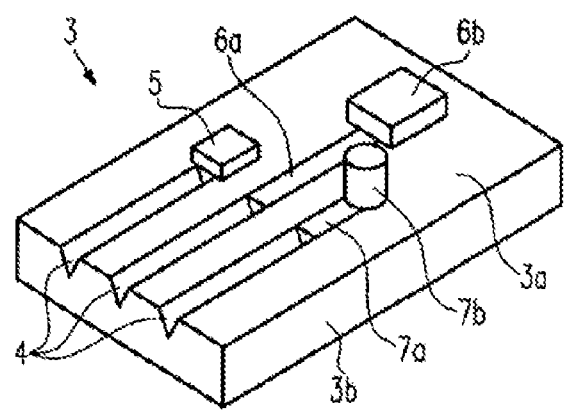

In FIGS. 4a-4d through 6a-6d, those portions and/or components already described with reference to FIGS. 1a-1d to 3a-3d are identified by the same references. Accordingly, these portions and/or components will not be further described in the following. The embodiment of the method of the present invention to be described in the following with reference to FIGS. 4a-4d to 6a-6d substantially correspond to the method already described with reference to FIGS. 1a-1d through 3a-3d, with the main difference that the optoelectronic device assembled according to this embodiment comprises a particular optical ferrule. This optical ferrule comprises in particular, as depicted in FIGS. 4a and 4b a securing portion 12 extending or protruding from the main body 16 of the optical ferrule 1. In the example depicted in FIGS. 4a and 4b, this securing portion has a ring or annular shape; however, other shapes for the securing portion 12 may be selected depending upon the circumstances as well as upon the shape of the main body 1b of the optical ferrule 1. A ring shaped securing portion 12 has revealed to be of particular advantage in the case of optical ferrules 1 having a tubular and/or cylindrical elongated main body 1b as depicted in FIGS. 4a and 4b; however, optical ferrules with different shapes may be used without departing from the scope of the present invention. For instance, optical ferrules with a main body having a square cross sectional shape may be selected. In this case it has revealed to be convenient to provide securing portions 12 with a shape fitting with the shape of the main body, for instance securing portions having a square cross sectional shape.

Figure 5A:
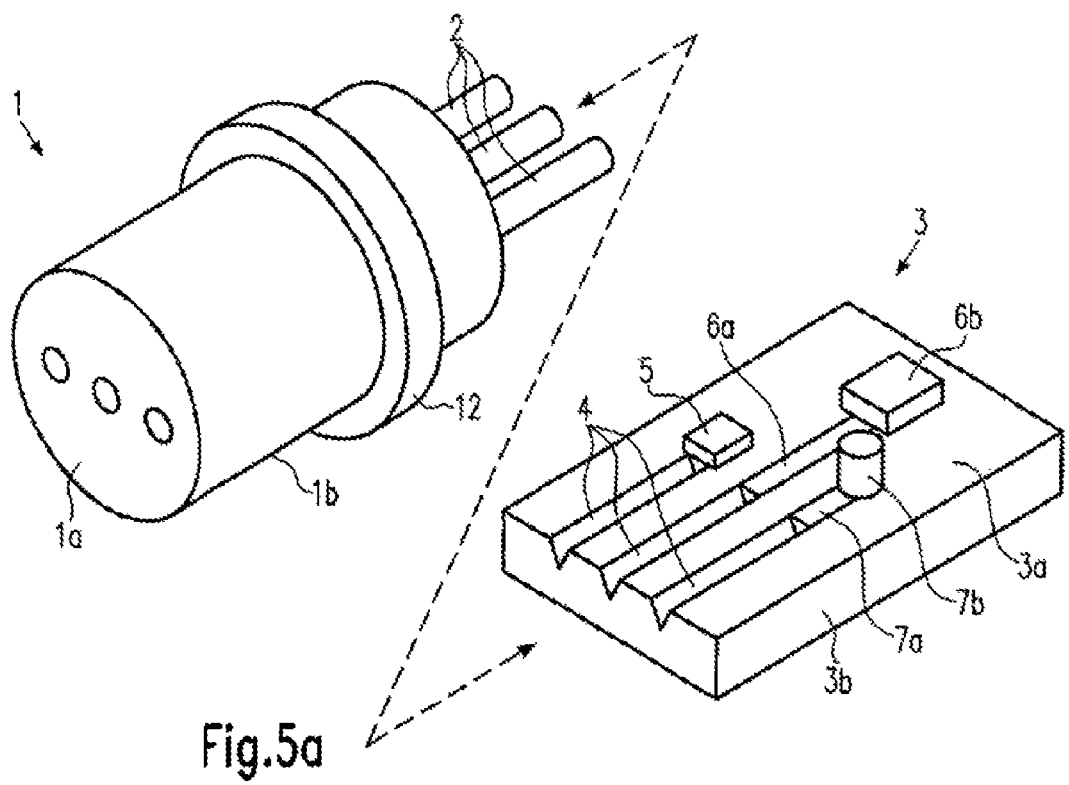
In FIG. 5a there is depicted a method step according to which the optical ferrule of FIGS. 4a and 4b is secured to the planar lightwave circuit of FIGS. 4c and 4d.

In the same way as in the case of the embodiment depicted with reference to FIGS. 1a-1d through 3a-3d, an optical subassembly is formed during a first step as depicted in FIG. 5a, by securing the optical ferrule 1 to an optical circuit 3 comprising a substrate or bench 3b on which grooves 4 are formed. The optical ferrule 1 is secured to the optical circuit 3 by introducing the optical fibers 2 into the grooves 4 provided on the substrate 3b in such a way that the optical fibers 2 are at least partially received within the grooves 4. Epoxy or a similar adhesive may be used for the purpose of securing the optical ferrule 1 to the optical circuit 3. Alternatively, metal portions provided on both the optical ferrule 1 and the substrate 3b of the optical circuit 3 may be welded or soldered to each other for the purpose of securing the optical ferrule 1 to the optical circuit 3.

Figure 5B:
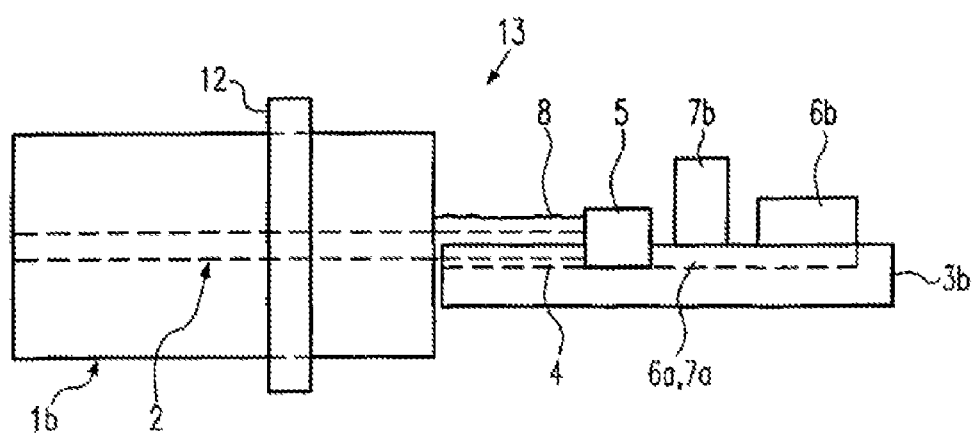
FIGS. 5b and 5c represent a side view and an exploded view, respectively, of an optical subassembly obtained by securing the optical ferrule of FIGS. 4a and 4b to the planar lightwave circuit of FIGS. 4c and 4d.
Figure 5C:
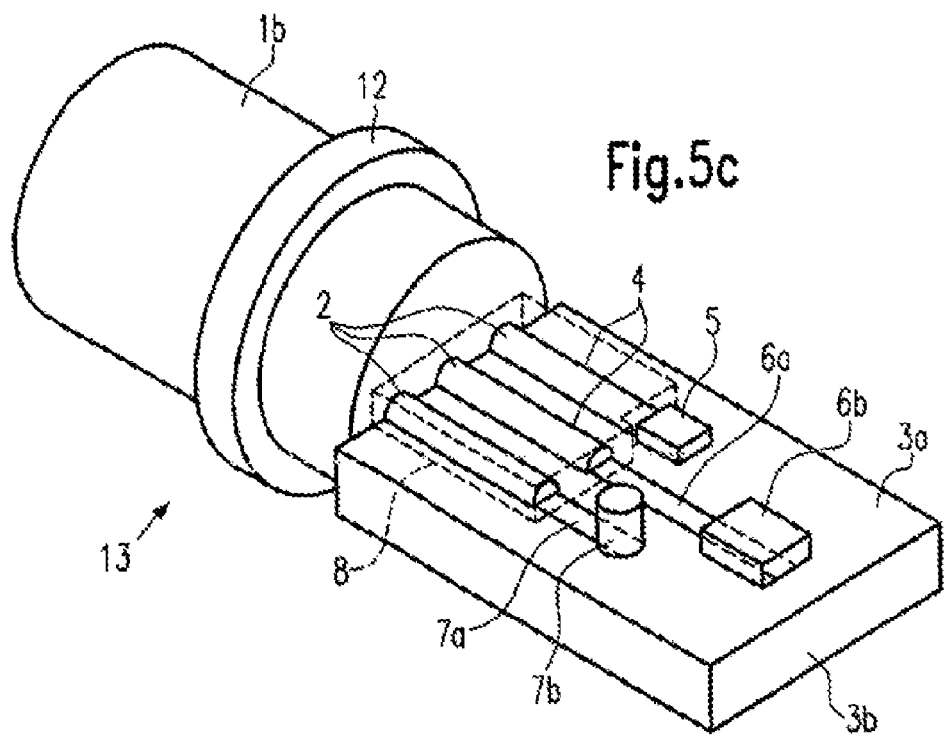

The optical subassembly 13 obtained, by securing the optical ferrule 1 to the optical circuit 3 is depicted in FIG. 5b and FIG. 5c. As apparent from FIGS. 5b and 5c the optical subassembly 13 obtained, substantially corresponds to the optical subassembly as depicted in FIGS. 2b and 2c, with the main difference that the optical ferrule 1 of the optical subassembly 13 depicted in FIGS. 5b and 5c comprises the securing portion 12 protruding from its main body 1b.

Figure 6A:
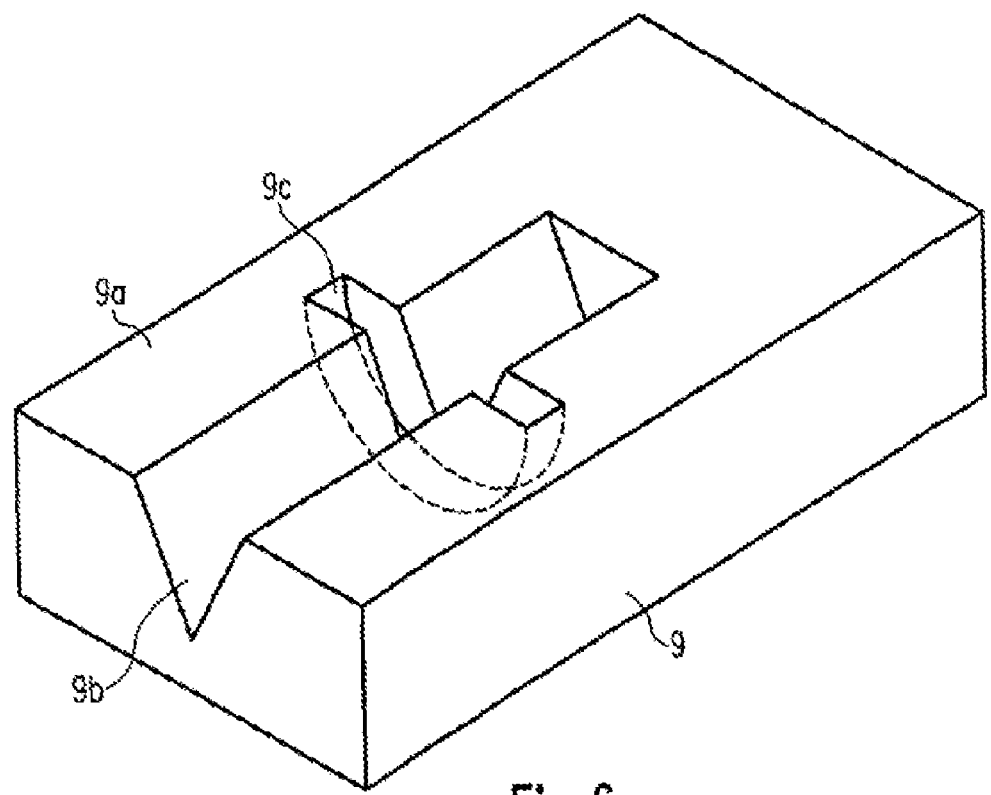
FIG. 6a represents an exploded view of a substrate on which the optical subassembly of FIGS. 5b and 6c may be secured according to a further embodiment of the method of the present invention.

In FIG. 6a there is depicted a substrate 9, for instance a printed circuit board or any other kind of substrate along those known in the art, adapted to receive the optical subassembly 13 depicted in FIG. 5c. The substrate 9 of FIG. 6a substantially corresponds to the substrate 9 of FIG. 3a, with the main difference that the groove 9b formed on the substrate comprises a main portion adapted to receive at least partially the main body 1b of the optical ferrule 1 and a second portion 9c specially adapted for receiving and/or housing at least partially the securing portion 12 of the optical ferrule 1. In the example depicted in FIG. 6a, the second portion 9c of the groove 9b has a semicircular cross sectional shape; this is due to the fact that also the securing portion 12 to be at least partially received into the second portion 9c of the groove 9b has a ring shape. However, it will be clear to those skilled in the art that other shapes may be selected for the second portion 9c of the groove 9b, for those applications in which other shapes are selected for the securing portion 12 of the optical ferrule 1

Figure 6B:
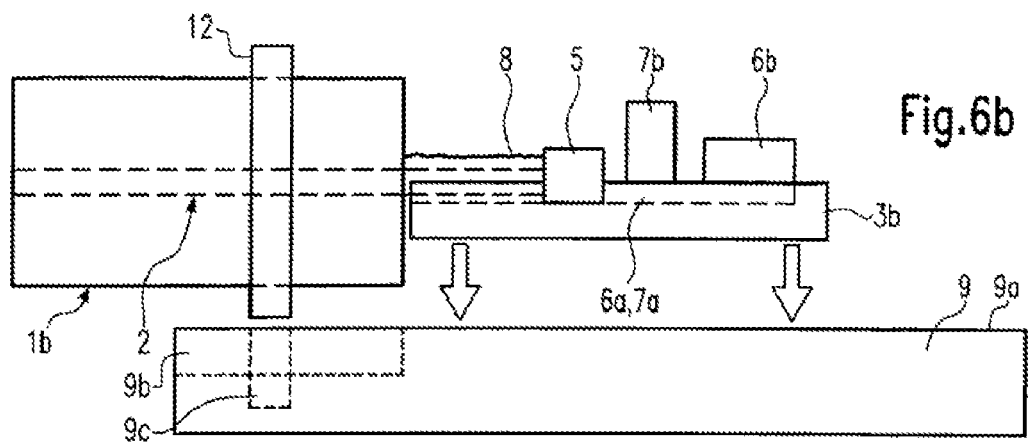
Figure 6C:
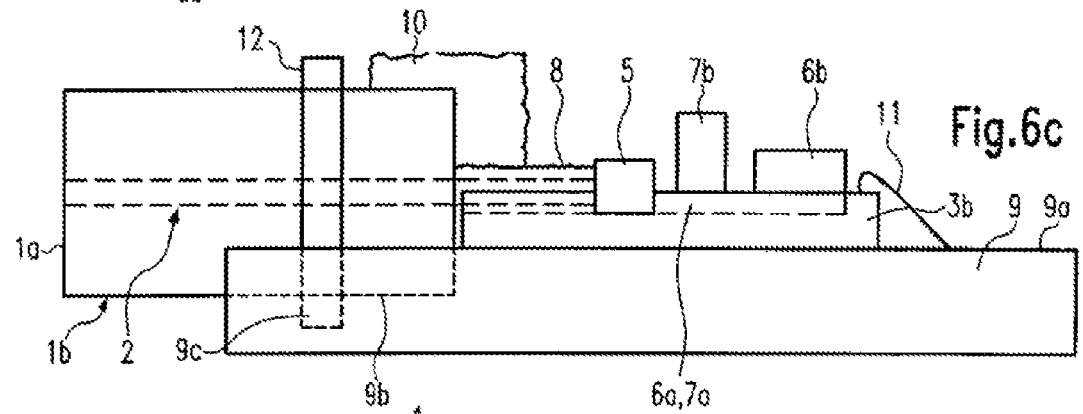

During further steps as depicted in FIGS. 6b and 6c, the optical subassembly 13 of FIG. 5c is secured to the substrate 9 of FIG. 6a. To this end, during a first step as depicted in FIG. 6b, the optical subassembly is aligned with substrate 9 or, in other words, the securing portion 12 of the optical ferrule 1 is brought into correspondence with the second portion 9c of the groove 9b.

Once the optical subassembly 13 comprising the optical ferrule 1 and the optical circuit 3 has been aligned with the substrate 9 as depicted in FIG. 6b, the optical subassembly 13 is placed on the substrate 9 and secured to it during further steps as depicted in FIG. 6c. For the purpose of securing the optical subassembly 13 to the substrate 9 the solutions and/or the materials as disclosed in the case of the method disclosed with reference to FIGS. 1a-1d through 3a-3d may be used. For instance, adhesive materials such as epoxy may be used; moreover, welding may be used in addition or in alternative to adhesive materials. Once the optical subassembly 13 comprising the optical ferrule 1 with the securing portion 12 and the optical circuit 3 has been secured to the substrate 9 a wire bonding step is carried out for electrically connecting the optical subassembly 13 to the substrate 9. For instance, to this end, wires 11 may be welded and/or soldered to conductive pads and/or strips provided on both the optical subassembly 13 (in the example depicted in FIG. 6c on the optical circuit 3) and the substrate 9.

Figure 6D:
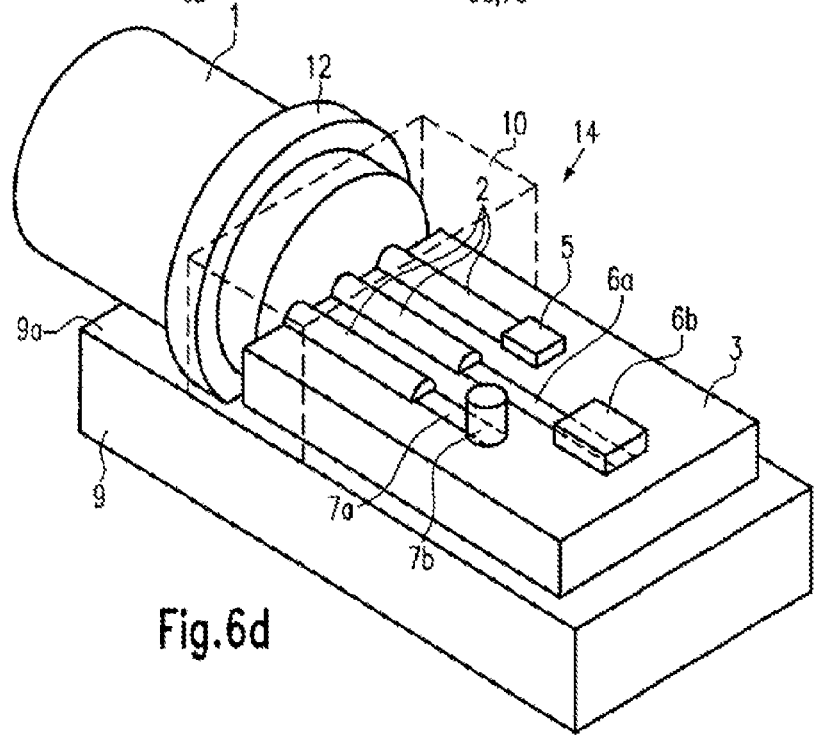
In FIG. 6d there is depicted in an exploded view an optoelectronic device assembled according to an embodiment of the method of the present invention.

The final optoelectronic device assembled as disclosed above is depicted in FIG. 6d. The optoelectronic device 14 depicted in FIG. 6d offers the further advantage that all the mechanical stress on the optical ferrule 1 arising when the optoelectronic device is connected and/or disconnected with an external appliance will be absorbed from the substrate 9 rather than from the optical circuit 3 or the optical fibers 2. Accordingly, any risk is avoided that the optoelectronic device gets damaged during connecting and/or disconnecting operations with an external appliance.

Summarizing, it arises from the above disclosure that the method according to the present invention of assembling optoelectronic devices allows to easily assemble devices which may be reliably connected to and disconnected from external appliances.

Moreover, the method according to the present invention allows to make use of standard technologies such as SMT technology and COB technology; as explained above this was not possible for those applications in which optoelectronic devices comprising one or more optical ferrules had to be assembled.

Finally, the optoelectronic devices assembled according to the method of the present invention may be packaged into the specific form wanted with standard techniques.

While the present invention has been described with reference to particular embodiments, it has to be understood that the present invention is not limited to the particular embodiments described but rather than various amendments may be introduced into the embodiments described without departing from the scope of the present invention which is defined by the appended claims.

The invention claimed is:

1. An apparatus, comprising:
a first substrate;
at least one optical ferrule with terminals of one or more optical fibers exiting an end surface of each optical ferrule secured to the first substrate to form an optical subassembly;
a second substrate including a main surface and at least one groove extending inward from the main surface;
the optical subassembly being secured to the second substrate such that the at least one optical ferrule is at least partially received in the at least one groove of the second substrate and that the first substrate is between the one or more optical fibers and the second substrate, and such that the at least one groove restrains at least a portion of the at least one optical ferrule, wherein:
the at least one optical ferrule includes a main body and at least one securing portion extending from the main body;
the at least one groove includes a first main portion and at least one second portion;
the main body of the at least one optical ferrule is at least partially received in the first main portion of the at least one groove; and
at least one portion of the at least one securing portion of the at least optical ferrule is at least partially received in the at least one second portion of the at least one groove.

2. The apparatus of claim 1, wherein:
the main body has a substantially elongated shape and an interface surface; and
the optical subassembly is secured to the second substrate such that a portion of the main body extending from the interface surface is disposed outside of the at least one groove.

3. The apparatus of claim 1, wherein the main body of the at least one optical ferrule has a substantially cylindrical shape and the at least one securing portion has a substantially ring shape.

4. The apparatus of claim 1, wherein:
the first substrate includes a main surface and at least one groove extending inward from the main surface; and
the terminals of the one or more optical fibers are at least partially received into the at least one groove of the first substrate.

5. An apparatus, comprising:
a first substrate;

at least one optical ferrule with terminals of one or more optical fibers exiting an end surface of each optical ferrule secured to the first substrate to form an optical subassembly;

a second substrate including a main surface and at least one groove extending inward from the main surface;

the optical subassembly being secured to the second substrate such that the at least one optical ferrule is at least partially received in the at least one groove of the second substrate and that the first substrate is between the one or more optical fibers and the second substrate, and such that the at least one groove restrains at least a portion of the at least one optical ferrule, wherein the first substrate includes a main surface and at least one groove extending inward from the main surface; and the terminals of the one or more optical fibers are at least partially received into the at least one groove of the first substrate, and further wherein:

the first substrate includes at least one optical, waveguide; and the terminals of the one or more optical fibers are optically connected to the at least one optical waveguide.

6. The apparatus of claim 5, wherein at least one optical device is disposed on the first substrate and is optically connected with the at least one optical waveguide.

7. The apparatus of claim 5 wherein:

the at least one optical ferrule includes at least one metal portion;

at least one metal pad is disposed on the second substrate; and the at least one metal portion of the at least one optical ferrule is soldered to the at least one metal pad on the second substrate.

8. An optical connecting device comprising an apparatus as claimed in claim 5 and an optical device adapted to be connected to the apparatus.

9. The optical connecting device of claim 8, wherein the optical device is adapted to be connected to the apparatus through the at least one optical ferrule.

* * * * *